US011859511B2

(12) United States Patent
Barker et al.

(10) Patent No.: US 11,859,511 B2
(45) Date of Patent: Jan. 2, 2024

(54) CO AND COUNTER FLOW HEAT EXCHANGER

(71) Applicants: Rolls-Royce Corporation, Indianapolis, IN (US); Rolls-Royce North American Technologies Inc., Indianapolis, IN (US)

(72) Inventors: Brett Barker, Indianapolis, IN (US); Eric Koenig, Indianapolis, IN (US); Jerry Layne, Indianapolis, IN (US); Jeffrey F. Rhodes, Indianapolis, IN (US)

(73) Assignees: ROLLS-ROYCE NORTH AMERICAN TECHNOLOGIES INC., Indianapolis, IN (US); ROLLS-ROYCE CORPORATION, Indianapolis, IN (US)

( * ) Notice: Subject to any disclaimer, the term of this patent is extended or adjusted under 35 U.S.C. 154(b) by 19 days.

(21) Appl. No.: 17/520,067

(22) Filed: Nov. 5, 2021

(65) Prior Publication Data

US 2023/0141484 A1 May 11, 2023

(51) Int. Cl.
*F01D 5/18* (2006.01)
*F01D 5/14* (2006.01)

(52) U.S. Cl.
CPC ............. *F01D 5/187* (2013.01); *F01D 5/147* (2013.01); *F05D 2240/303* (2013.01);
(Continued)

(58) Field of Classification Search
CPC ........................... F01D 5/187; F05D 2260/204
See application file for complete search history.

(56) References Cited

U.S. PATENT DOCUMENTS 6,213,714 B1 4/2001 Rhodes
6,254,334 B1 * 7/2001 LaFleur ................. F01D 25/12 415/115
(Continued)

FOREIGN PATENT DOCUMENTS

EP 3 354 846 B1 5/2020
EP 3 498 973 B1 9/2020
(Continued)

OTHER PUBLICATIONS

Sweeney, P.C., Rhodes, J.F., “An Infrared Technique for Evaluating Turbine Airfoil Cooling Designs,” Jun. 7, 1999, pp. 1-10, International Gas Turbine & Aeroengine Congress & Exhibition, Indianapolis, IN Jun. 7-Jun. 10, 1999; ASME 99-GT-142.

*Primary Examiner* — David E Sosnowski
*Assistant Examiner* — Arthur Paul Golik
(74) *Attorney, Agent, or Firm* — Crowell & Moring LLP

(57) ABSTRACT

Airfoils and methods of cooling an airfoil are provided. The airfoil may comprise a spar; a coversheet on the spar; and a dual feed circuit between the spar and the coversheet. The dual feed circuit may include a first dam, a second dam spaced apart from the first dam along the chord axis of the spar, a first inlet disposed adjacent to the first dam, a second inlet disposed adjacent to the second dam, a circuit outlet disposed between the first inlet and the second inlet, and a plurality of diamond and/or hexagonal pedestals disposed on an outer surface of the spar. The diamond and/or hexagonal pedestals may form a plurality of cooling channels between the first inlet, the second inlet, and the circuit outlet. There may be no other circuit inlets are located between the first inlet and the second inlet.

18 Claims, 5 Drawing Sheets

(52) U.S. Cl.
CPC .. *F05D 2240/304* (2013.01); *F05D 2260/202* (2013.01); *F05D 2260/213* (2013.01); *F05D 2260/2214* (2013.01)

(56) References Cited

U.S. PATENT DOCUMENTS

| | | | | |
|---|---|---|---|---|
| 6,264,428 | B1 | 7/2001 | Dailey et al. | |
| 6,514,042 | B2 * | 2/2003 | Kvasnak | F01D 25/12 415/115 |
| 7,527,474 | B1 * | 5/2009 | Liang | F01D 5/189 416/97 R |
| 8,535,004 | B2 | 9/2013 | Campbell | |
| 10,060,264 | B2 | 8/2018 | Moga et al. | |
| 10,450,873 | B2 | 10/2019 | Barker et al. | |
| 10,626,731 | B2 | 4/2020 | Barker et al. | |
| 10,648,341 | B2 * | 5/2020 | Barker | F01D 9/065 |
| 10,989,056 | B2 | 4/2021 | Mongillo, Jr. et al. | |
| 2017/0030200 | A1 * | 2/2017 | Krückels | F01D 25/12 |
| 2020/0018174 | A1 | 1/2020 | Clum et al. | |
| 2020/0217207 | A1 | 7/2020 | Loebig et al. | |

FOREIGN PATENT DOCUMENTS

| | | | | | |
|---|---|---|---|---|---|
| GB | 2314126 | A | * | 12/1997 | F01D 11/10 |
| GB | 2 438 861 | A | | 12/2007 | |
| GB | 2523140 | A | * | 8/2015 | F01D 5/188 |

* cited by examiner

CO AND COUNTER FLOW HEAT EXCHANGER

TECHNICAL FIELD

This disclosure relates to airfoils and, in particular, airfoil cooling schemes.

BACKGROUND

Present airfoil cooling systems suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
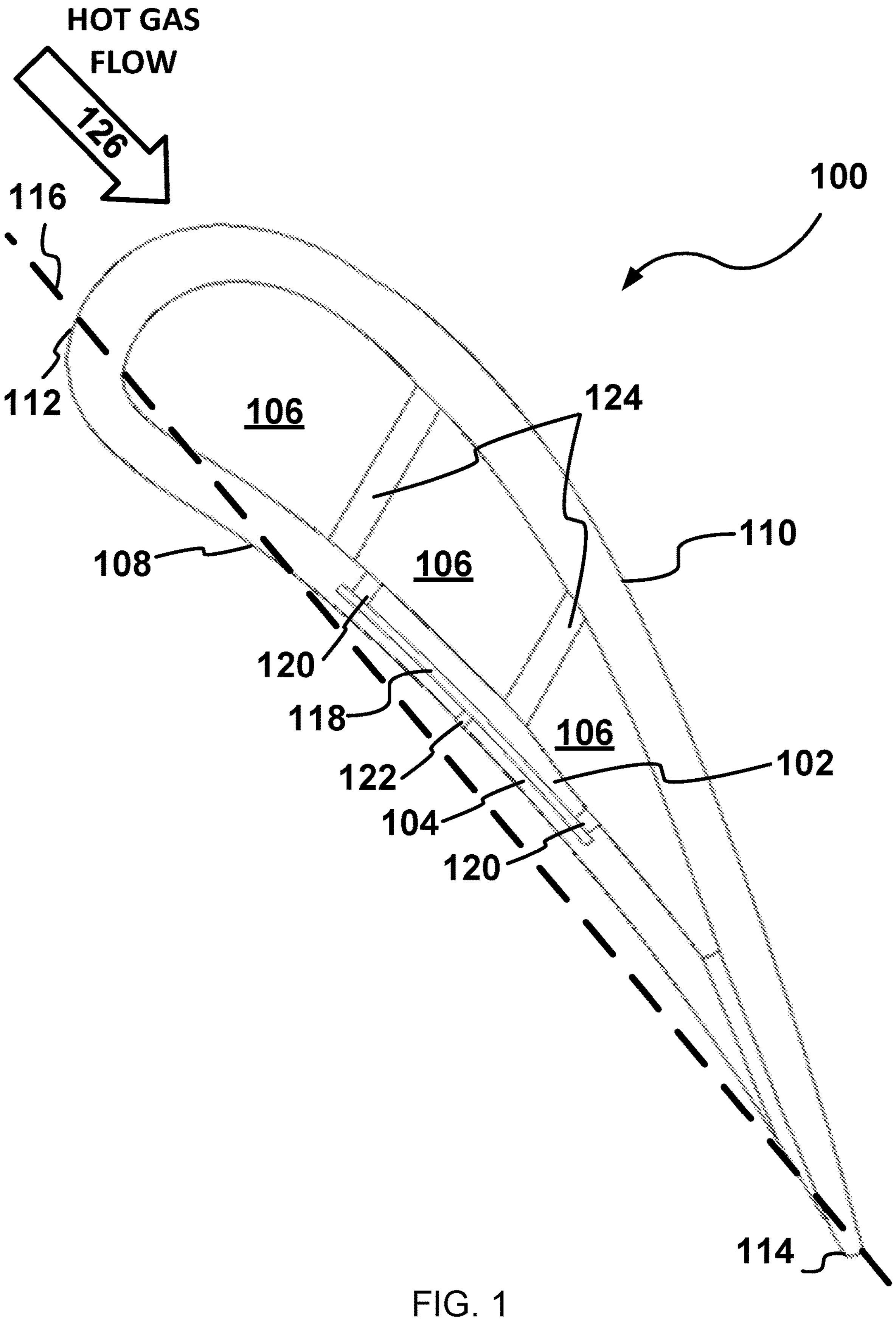
FIG. 1 illustrates a cross-sectional view of an airfoil.

In a first example, a dual-wall airfoil may comprise a spar. The spar has a chord axis and a span axis. The dual-wall airfoil comprises a coversheet on the spar and a dual feed circuit between the spar and the coversheet. The dual feed circuit includes a first dam, a second dam spaced apart from the first dam along the chord axis of the spar, a first inlet disposed adjacent to the first dam, a second inlet disposed adjacent to the second dam, a circuit outlet disposed between the first inlet and the second inlet, and diamond and/or hexangular pedestals disposed on an outer surface of the spar. The outer surface of the spar faces the coversheet. The diamond and/or hexangular pedestals are located between the first inlet and the second inlet. The diamond and/or hexangular pedestals form multiple cooling channels between the first inlet and the circuit outlet and between the second inlet and the circuit outlet. No other circuit inlets are located between the first inlet and the second inlet.

In a second example, a dual-wall airfoil comprises the spar. The spar includes a plurality of internal cavities. The internal cavities include a first cavity disposed at a leading edge of the airfoil, a second cavity disposed at a trailing edge of the airfoil, a third cavity disposed between the first cavity and the second cavity. The spar further comprises the coversheet on the spar and the dual feed circuit disposed between the spar and the coversheet. The dual feed circuit includes the first dam, the second dam, the first inlet disposed adjacent to the first dam, the second inlet disposed adjacent to the second dam, and the circuit outlet disposed between the first inlet and the second inlet. The first inlet connects the first cavity to the dual feed circuit and the second inlet may connect the third cavity to the dual feed circuit. Alternatively or additionally, the first inlet connects the third cavity to the dual feed circuit and the second inlet connects the second cavity to the dual feed circuit.

In a third example, a method of cooling the airfoil comprises: supplying a cooling fluid to the first internal cavity of an airfoil spar and the second internal cavity of the airfoil spar. The method comprises directing the cooling fluid from the first internal cavity through the first inlet to a dual feed circuit. The first inlet is immediately adjacent to the first dam of the dual feed circuit. The method comprises directing the cooling fluid from the second internal cavity though the second inlet to the dual feed circuit. The second inlet may be adjacent to the second dam of the dual feed circuit. The method comprises directing the cooling fluid from the first inlet downstream through a plurality of diamond and/or hexangular pedestals and through the circuit outlet. The method comprises directing the cooling fluid from the second inlet upstream through the plurality of diamond and/or hexangular pedestals and through the circuit outlet. The method comprises directing the cooling fluid from the circuit outlet along an outer surface of the airfoil downstream of the circuit outlet.

One interesting feature of the systems and methods described below may be that dual feed circuits provide an effective airfoil cooling scheme while using less flow and/or delta pressure as compared to exclusively co-fed or counter-fed circuits. For example, by providing a dual feed circuit, which uses both co and counter flow feeds, the upstream side of the circuit is cooled using a co-fed heat exchanger while the downstream side of the circuit is fed using a counter-fed heat exchanger. The two inlets for the dual feed circuit (one upstream and one downstream of the outlet) and lower sink pressure (of the downstream inlet versus the upstream inlet) raises the pressure difference in the dual feed circuit to drive more coolant than an exclusively counter-fed circuit.

Alternatively, or in addition, by having the dual feed supply an outlet positioned between the two inlets, the downstream portion of the circuit also benefits from film cooling as cooling fluid exits the outlet. Alternatively, or in addition, an interesting feature of the systems and methods described below may be that by having two inlets, or two rows of inlets each disposed on an opposite end of the circuit, the inlet holes can be larger to mitigate blockage risk and to ensure adequate film coverage downstream of the outlet.

Alternatively, or in addition, dual feed circuits may be used in areas where there is a relatively high exit pressure, for example, on the pressure side and/or near the leading edge, in order to provide adequate cooling efficiently. Alternatively, or in addition, dual feed circuits allow for more flexibility in packaging the circuit on the airfoil, as the circuit inlets can be positioned independent from the circuit outlet to avoid internal ribs of the spar.

FIG. 1 illustrates an example of an airfoil 100. The airfoil 100 may include a spar 102, a coversheet 104, an internal cavity 106, a pressure side 108, a suction side 110, a leading edge 112, a trailing edge 114, a chord axis 116, a heat exchanging circuit 118, a circuit inlet 120, and/or a circuit outlet 122.

The leading edge 112 may be any point at the front of the airfoil 100. The airfoil 100 is designed to have a fluid flow 126, such as a flow of hot gases exiting a combustor of a gas turbine engine, flow around the airfoil 100. The front of the airfoil 100 may be considered the side of the airfoil 100 facing into the fluid flow 126. Alternatively, or additionally, the leading edge 112 may be the most upstream edge of the airfoil 100. Upstream refers to a direction opposite of the direction of the fluid flow 126. Alternatively or in addition, the leading edge 112 may be at a stagnation point, which is where a flow velocity of the fluid flow 126 is reduced to zero. The trailing edge 114 may be at the back of the airfoil 100. The back of the airfoil 100 may be the side of the airfoil opposite of the front and/or opposite of the leading edge of the airfoil 100. The trailing edge 114 may be the most downstream edge of the airfoil 100. Downstream refers to the direction of the fluid flow 126. The leading edge 112 may be opposite the trailing edge 114. The pressure side 108 of the airfoil 100 is a side designed to have a comparatively higher static pressure than the suction side 110 in the presence of the fluid flow 126 so as to contribute to a lift force generated by the airfoil 100. The pressure side 108 may extend from the leading edge 112 to the trailing edge 114 of the airfoil 100. The suction side 110 may extend from the leading edge 112 to the trailing edge 114 of the airfoil 100 on a side that is opposite of the pressure side 108. The chord axis 116 may extend along the chord-wise length of the airfoil 100, in some examples connecting the leading edge 112 and the trailing edge 114.

The spar 102 may form an inner structure of the airfoil 100. For example, the spar 102 may form an inner wall of the airfoil 100 and one or more internal cavities 106 of the airfoil 100. One or more internal ribs 124 may separate multiple internal cavities 106. The coversheet 104 may form an outer wall of the airfoil 100. The coversheet 104 may surround and/or encompass the spar 102. The heat exchanging circuit 118 may be disposed in between the spar 102 and the coversheet 104. Multiple heat exchanging circuits 118 may be disposed between the spar 102 and coversheet 104. The heat exchanging circuits 118 may be located around the circumference of the spar 102. Each heat exchanging circuit 118 may include a circuit inlet 120 and a circuit outlet 122. The circuit inlet 120 may connect the heat exchanging circuit 118 to an internal cavity 106 so that the internal cavity 106 is in fluid communication with the heat exchanging circuit. The circuit outlet 122 may connect the heat exchanging circuit 118 to a flow of fluid external to the airfoil 100 so that the heat exchanging circuit 118 is in fluid communication with a fluid flowing 126 over and/or around the airfoil 100 and/or the outer surface of the coversheet 104.

The airfoil 100 is a dual wall airfoil, wherein the coversheet 104 is the outer wall and the spar 102 is the inner wall. The airfoil 100 may be part of a gas turbine engine, for example, the airfoil 100 may be a blade and/or vane of the gas turbine engine. The gas turbine engine may be configured to supply power to and/or provide propulsion for an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively, or in addition, the gas turbine engine may be utilized in a configuration unrelated to an aircraft such as, for example, an industrial application, an energy application, a power plant, a pumping set, a marine application (for example, for naval propulsion), a weapon system, a security system, a perimeter defense or security system.

The spar 102 may be any structure that extends along a span axis (shown in FIG. 3) of the airfoil 100 and through the center of the airfoil 100. The spar 102 may comprise any rigid structural material, for example, a metal and/or a composite material. The internal cavities 106 may extend inside the spar 102 along the span axis. The spar 102 may include a single internal cavity 106 or multiple internal cavities 106. In some examples, the internal cavities 106 may be divided by internal ribs 124 into an upstream internal cavity 106 at the front of the airfoil 100, a downstream internal cavity 106 at the back of the airfoil 100, and/or one or more central internal cavities 106 disposed between the upstream and downstream internal cavities 106. The number of internal cavities 106 may vary. For example, the spar 102 may have as few as one single internal cavity 106 or as many as six internal cavities 106. A dual-feed circuit may be fed by one or two internal cavities 106. The internal cavities 106 feeding the dual-feed circuit may not be adjacent to each other. For example, two internal cavities 106 that feed the same dual-feed circuit may have a third internal cavity 106 disposed between the two internal cavities 106, third internal cavity 106 may not feed the same dual-feed circuit that the other two internal cavities 106 feed.

The coversheet 104 may be any structure positioned on the spar 102 that forms an outer layer of the airfoil 100. The coversheet 104 may be made of any material capable of forming an outer surface of the airfoil 100, for example, a metal alloy.

The heat exchanging circuit 118 may be formed by the gap and/or space between the outer surface of the spar 102 and the inner surface of the coversheet 104. The heat exchanging circuit 118 may be a cooling circuit, by which the airfoil 100 is cooled. The heat exchanging circuit 118 may include a channel formed between the spar 102 and the coversheet 104. The heat exchanging circuit 118 may be a dual feed circuit, a counter feed circuit, and/or a co feed circuit. A dual feed circuit may include at least two circuit inlets 120 and at least one circuit outlet 122. The two circuit inlets 120 may be spaced apart from each other along the chord axis 116 of the airfoil 100, wherein the circuit inlets 120 are disposed at an opposite ends of the dual feed circuit. For example, a circuit inlet 120 may be disposed adjacent to an upstream end of the dual feed circuit, or the end of the dual feed circuit closest to the leading edge 112 of the airfoil 100. Another circuit inlet 120 may be disposed at the downstream end of the dual feed circuit, or the end of the dual feed circuit closest to the trailing edge 114 of the airfoil 100. The circuit outlet 122 may be disposed between the two circuit inlets 120 along the chord axis 116, for example, at an approximate midpoint of the dual feed circuit along the chord axis 116. The airfoil 100 may comprise one or more dual feed circuits. The dual feed circuit may, for example, be disposed along the pressure side 108 of the airfoil 100 and/or near the leading edge 112 of the airfoil 100.

Additionally or alternatively the heat exchanging circuits 118 may be a co-feed and/or a counter-feed circuit. A co-feed circuit may have a circuit inlet 120 at an upstream end of the co-feed circuit, or the end of the co-feed circuit closest to the leading edge 112 of the airfoil 100. A co-feed circuit may have a circuit outlet 122 at a downstream end of the co-feed circuit, or the end of the co feed circuit closest to the trailing edge 114 of the airfoil. A counter-feed circuit may have a circuit inlet 120 at downstream end of the counter-feed circuit, or the end of the counter-feed circuit closest to the trailing edge 114 of the airfoil 100. A counter-feed circuit may have a circuit outlet 122 at an upstream end of the counter-feed circuit, or the end of the counter-feed circuit closest to the leading edge 112 of the airfoil. The airfoil 100 may include one or more dual feed circuits, co-feed circuits, and/or co-flow circuits around the airfoil 100 between the spar 102 and the coversheet 104.

A dual-feed circuit may, for example, be disposed at a midpoint along the chord axis 116 of the pressure side 108. A co-feed circuit may extend downstream from a downstream end of the dual-feed circuit, towards the trailing edge

114, and along the pressure side 108 of the airfoil 100, extending between the dual-feed circuit and the trailing edge 114 of the airfoil 100. For example, the co-feed circuit may extend from the dual-feed circuit to another heat exchanging circuit 118 that extends to, or covers, the trailing edge 114 of the airfoil 100. Additionally or alternatively, a counter-feed circuit may extend upstream from an upstream end of the dual-feed circuit, towards the leading edge 112, and along the pressure side of the airfoil 100, extending between the dual-feed circuit and the leading edge 112 of the airfoil 100. For example, the counter-feed circuit may extend from the dual-feed circuit to another heat exchanging circuit 118 that extends to, or covers, the leading edge 112 of the airfoil 100.

The circuit inlets 120 may be any sort of aperture in the spar 102, extending through the spar 102 wall from an internal cavity 106 to a heat exchanging circuit 118. The circuit inlets 120 may be, for example, a through-hole formed via machining or casting. The circuit inlets 120 may be perpendicular to the spar 102 wall, or may be formed at an acute or obtuse angle with the spar 102 wall. The circuit outlets 122 may be any sort of aperture in the coversheet 104, extending through the coversheet 104 from the heat exchanging circuit 118 and past the outer surface of the coversheet 104 and/or airfoil 100. The circuit outlets 122 may, for example, be film holes formed at an angle with the coversheet 104 to direct cooling fluid in a film over the outer surface of the coversheet 104 and/or airfoil 100 downstream from the circuit outlet 122.

During operation, a cooling fluid may flow from a cooling fluid source (not shown) into the internal cavities 106. For example, the cooling fluid may flow through a shank of the airfoil 100 into the internal cavities 106. The cooling fluid may come from an upstream component of the turbine engine, for example, bypass air from an upstream compressor. The cooling fluid and the fluid flow 126 may be the same fluid that originates from upstream and then is split between a cooling fluid flow and the hot fluid flow 126. The cooling fluid may flow from the internal cavities 106, through the circuit inlets 120 and into the heat exchanging circuits 118. The cooling fluid may flow from the circuit inlets 120, through the heat exchanging circuits 118, and towards the circuit outlets 122. In a dual feed circuit, for example, the cooling fluid may flow through a first internal cavity 106, through the circuit inlet 120 disposed near the end of the dual feed circuit closest to the leading edge 112 of the airfoil 100, flow downstream or towards the trailing edge 114 of the airfoil 100 to the circuit outlet 122, out the circuit outlet 122, and over the surface of the coversheet 104 downstream from the circuit outlet 122. In a dual feed circuit the cooling fluid may also flow through a second internal cavity 106, through the circuit inlet 120 disposed near the end of the dual feed circuit closest to the trailing edge 114 of the airfoil 100, flow upstream or towards the leading edge 112 of the airfoil 100 to the circuit outlet 122, combine with the cooling fluid flowing from the circuit inlet 120 closest to the leading edge 112 of the airfoil 100, out the circuit outlet 122, and over the surface of the coversheet 104 downstream from the circuit outlet 122.

Figure 2:
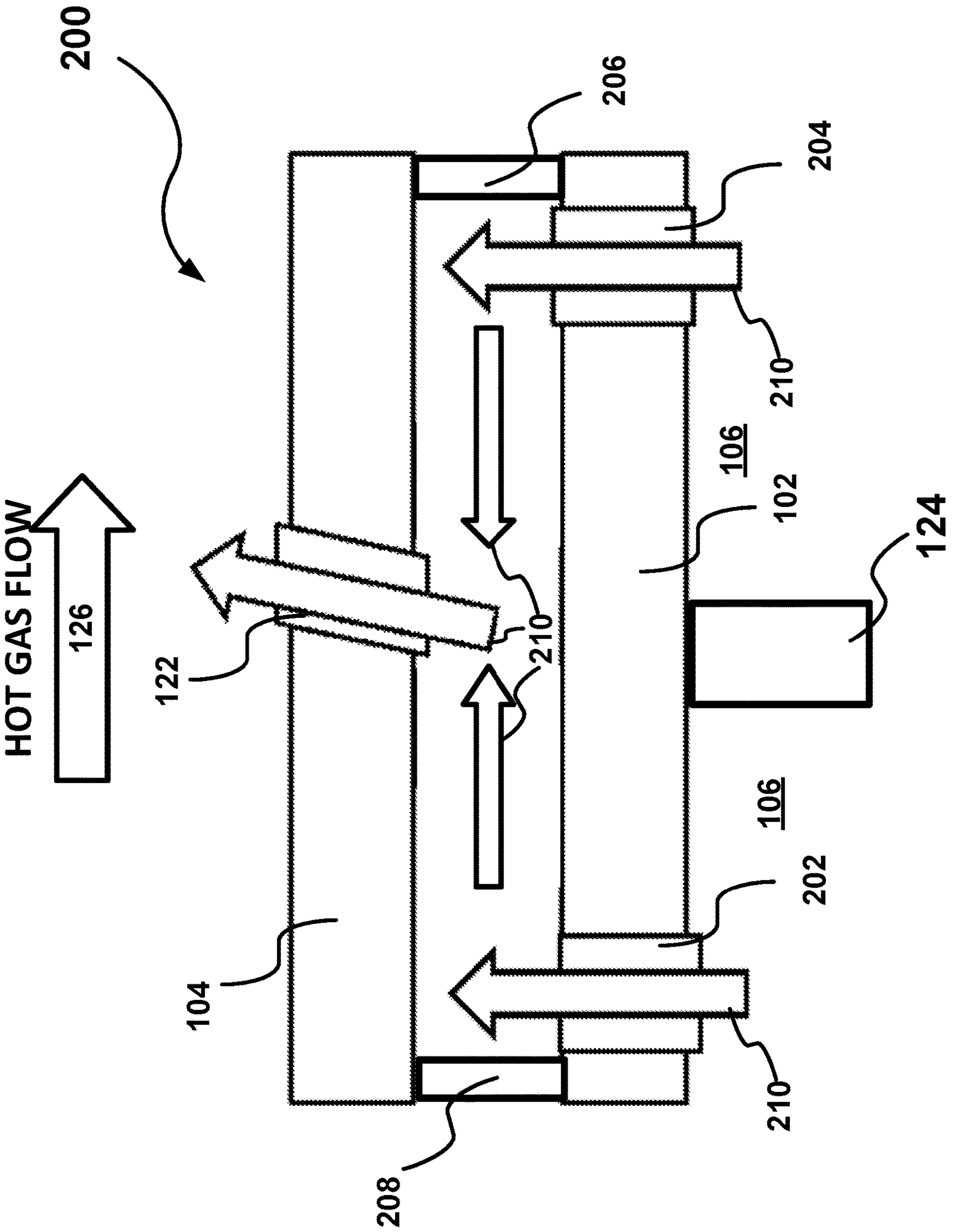
FIG. 2 illustrates a cross-sectional view of an example of a dual feed circuit of an airfoil.

FIG. 2 illustrates a cross section view of a dual feed circuit 200 of airfoil 100. The dual feed circuit 200 of FIG. 2 may be a heat exchanging circuit 118 of FIG. 1. The dual feed circuit 200 may be disposed between the spar 102 and the coversheet 104 of the airfoil 100. The dual feed circuit 200 may comprise an upstream circuit inlet 202, a downstream circuit inlet 204, an upstream dam 208, a downstream dam 206, and a circuit outlet 122. As mentioned above, the terms "upstream" and "downstream" are in reference to the direction that hot gas flows over the outer surface of the coversheet 104.

The upstream circuit inlet 202 may include one of the circuit inlets 120 from FIG. 1 and may be disposed adjacent to the upstream dam 208, which may be at the end of the dual feed circuit 200 that is closest to the leading edge 112 of the airfoil 100. The downstream circuit inlet 204 may be one of the circuit inlets 120 shown in FIG. 1 and may be disposed adjacent to the downstream dam 206. The downstream dam 206 may be at the end of the dual feed circuit 200 closest to the trailing edge 114 of the airfoil 100.

The upstream dam 208 and the downstream dam 206 may extend between the spar 102 and the coversheet 104 along each respective end of the dual feed circuit 200 so that cooling fluid may only enter or exit the dual feed circuit 200 from the circuit inlets 120, 202, 204 and/or the circuit outlet 122. The dams 206, 208 may be made of the same material as the spar 102 and/or the coversheet 104. For example, the dams 206, 208 may be part of a unitary structure with the spar 102 and/or the coversheet 104. Additionally, or alternatively, the dams 206, 208 may be a different material from the spar 102 and/or the coversheet 104. For example, the dams 206, 208 may be a baffle or seal inserted between the spar 102 and coversheet 104.

During operation, cooling fluid 210 may flow from two of the internal cavities 106 through the upstream circuit inlet 202 and through the downstream circuit inlet 204. Cooling fluid 210 may flow downstream from the upstream circuit inlet 202, through the upstream portion of the dual feed circuit, and out the circuit outlet 122. Alternatively or in addition, cooling fluid 210 may flow upstream from the downstream circuit inlet 204, through the downstream portion of the dual feed circuit 200, and out the circuit outlet 122. Cooling fluid 210 may flow out the circuit outlet 122 and form a film of cooling fluid over the outer surface of the coversheet 104 downstream of the circuit outlet 122 to cool the outer surface from the flow of hot gas external to the airfoil 100.

Figure 3:
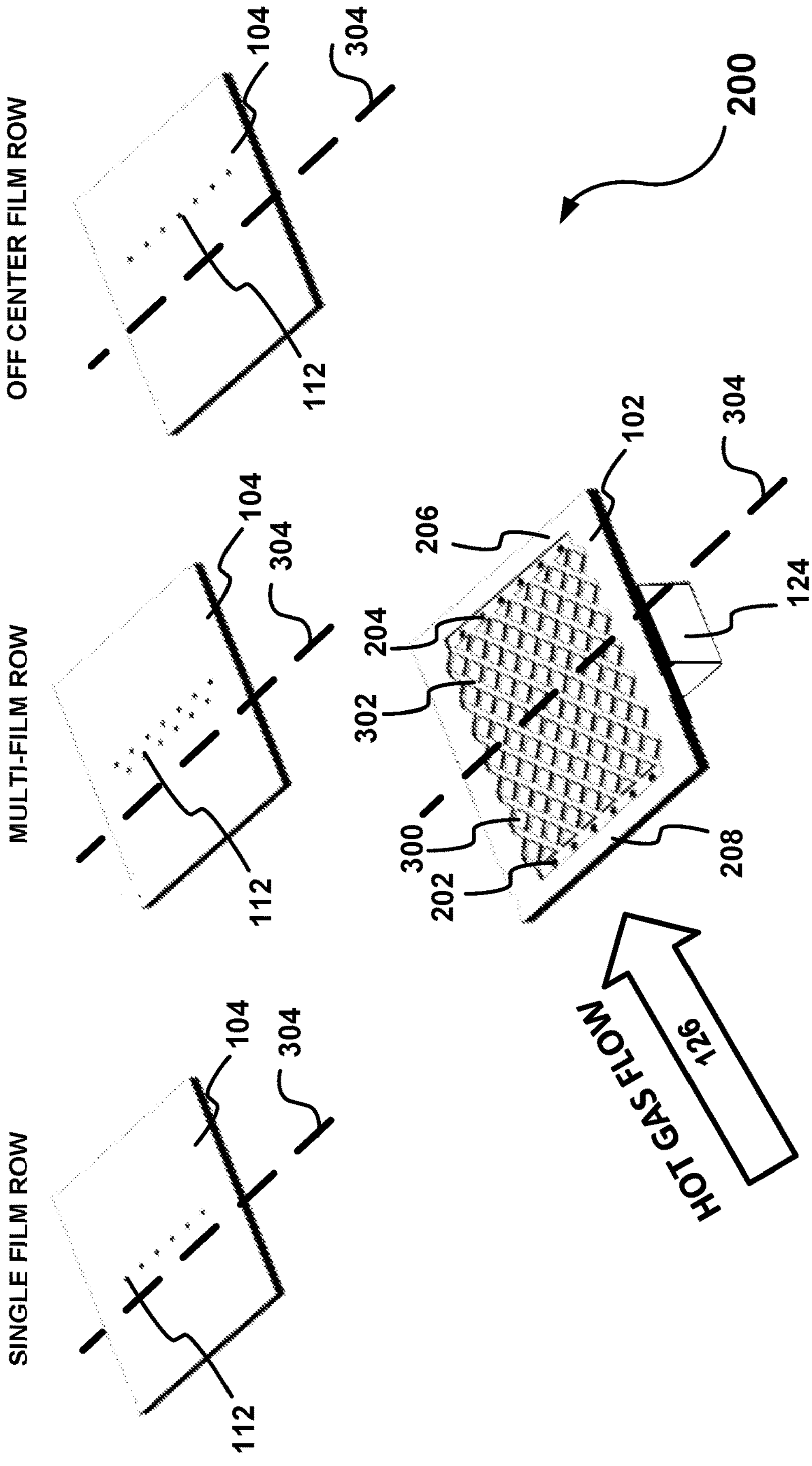
FIG. 3 illustrates an example of a spar and coversheet of a dual feed circuit.

FIG. 3 illustrates an exploded view of an example of the spar 102 and of the coversheet 104 of the dual feed circuit 200 of the airfoil 100. The spar 102 may comprise a plurality of pedestals 300 and cooling channels 302. The spar 102 may also comprise a plurality of upstream circuit inlet holes 306 and downstream circuit inlet holes 308. The coversheet 104 may comprise a plurality of circuit outlets 122.

The pedestals 300 may be part of a unitary structure with the spar 102. For example, the pedestals 300 may extend out away from the spar 102 towards the coversheet 104. The pedestals 300 may contact the coversheet 104. For example, the coversheet 104 may be joined to the spar 102 at the pedestals 300. The pedestal 300 may, for example, be square, diamond, and/or hexangular in shape and disposed in a repeating pattern. Cooling channels 302 may be formed in between the pedestals 300, spar 102, and coversheet 104.

The upstream circuit inlet 202 may comprise a plurality of upstream circuit inlet holes 306 disposed in a row extending along the span axis 304 of the airfoil 100 adjacent to the upstream dam 208. Additionally or alternatively, the downstream circuit inlet 204 may comprise a plurality of downstream circuit inlet holes 308 disposed in a row extending along the span axis 304 of the airfoil 100 adjacent to the downstream dam 206. The outer surface of the spar 102 may be unbroken and/or a continuous surface between the upstream circuit inlet holes 306 and the downstream circuit inlet holes 308, meaning, for example, there may be no other circuit inlets, holes, and/or openings on the outer surface of the spar 102 between the upstream circuit inlet holes 306 and the downstream circuit inlet holes 308 along the chord axis 116 (shown in FIG. 1). For example, there may not be any circuit inlets, holes, and/or openings between the pedestals of the dual feed circuit 200. The only openings, holes, and/or apertures on the outer surface of the spar and/or pedestals may be the circuit inlet holes 306, 308.

The circuit outlet 122 may comprise a plurality of circuit outlets 122. The plurality of circuit outlets 122 may be disposed in a single row extending along the span axis 304. Additionally, or alternatively, the circuit outlets 122 may be disposed in parallel rows. The circuit outlets 122 may be positioned at a midway point between the upstream circuit inlet holes 306 and the downstream circuit inlet holes 308. Additionally, or alternatively, the circuit outlets 122 may be disposed closer towards the upstream circuit inlet holes 306 than the downstream circuit inlet holes 308. Alternatively, the circuit outlets 122 may be disposed closer towards the downstream circuit inlet holes 308 than the upstream circuit inlet holes 306.

During operation, cooling fluid 210 may flow through the downstream circuit inlet holes 308, upstream through the cooling channels 302 between the pedestals 300, and to the circuit outlets 122. Additionally, or alternatively, cooling fluid may flow through the upstream circuit inlet holes 306, downstream through the cooling channels 302 between the pedestals 300 to the circuit outlets 122.

Figure 4:
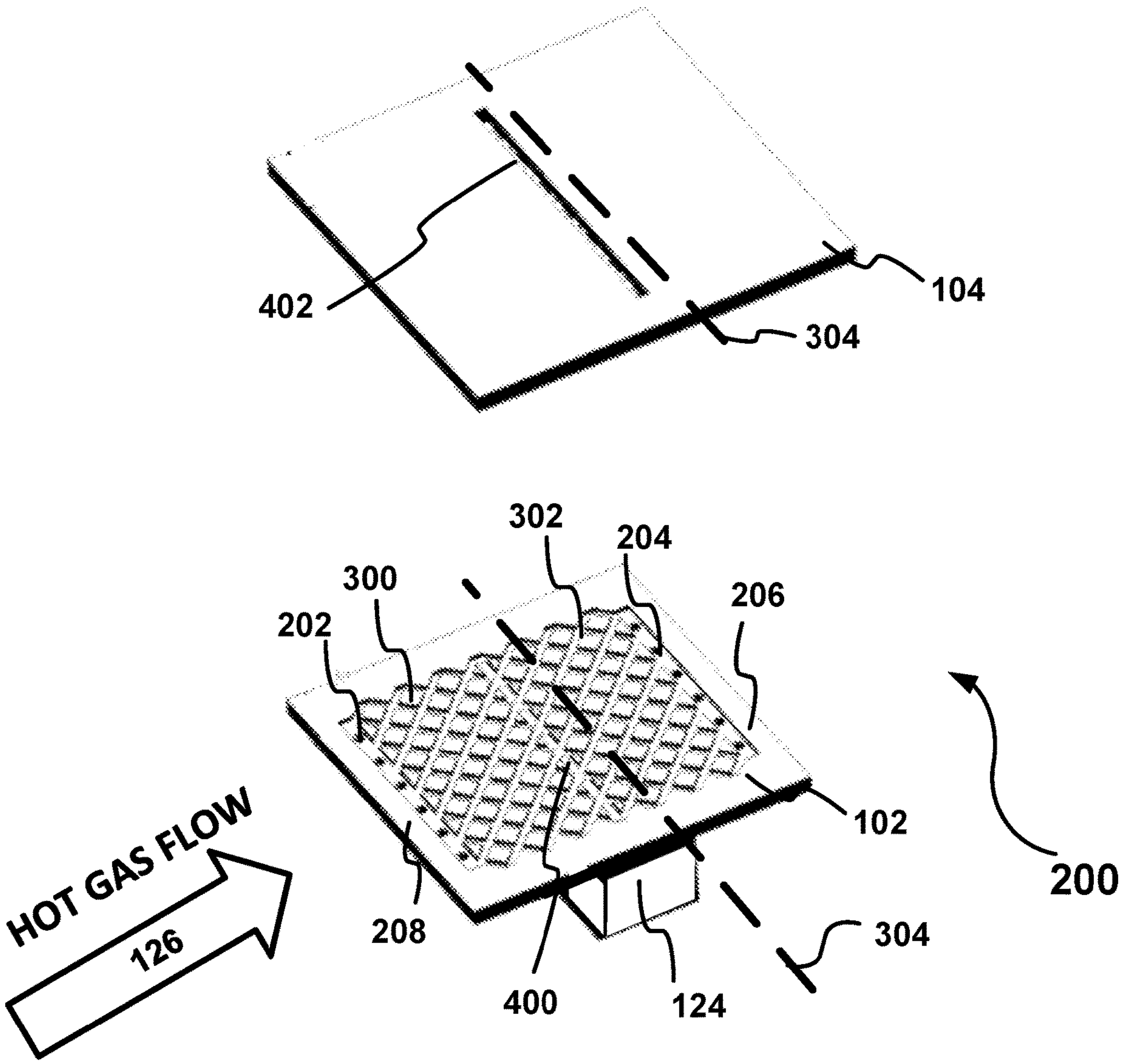
FIG. 4 illustrates another example of a spar and coversheet of a dual feed circuit.

FIG. 4 illustrates an exploded view of an example of the dual feed circuit 200 of the airfoil 100. The spar 102 may comprise a slot 400 extending along the span axis 304 through a row of the pedestals 300. The slot 400 in the pedestals may correspond to a slot circuit outlet 402. The slot circuit outlet 402 may be a circuit outlet 122 of FIGS. 1-3. The slot 400 through the pedestals and the slot circuit outlet 402 may extend along the spar 102 and the coversheet 104, respectively, along the span axis.

During operation, the cooling fluid 210 may flow form the circuit inlets 202, 204, through the cooling channels 302 between the pedestals 300, through the slot 400 extending through the pedestals 300, and out the slot circuit outlet 402.

Figure 5:
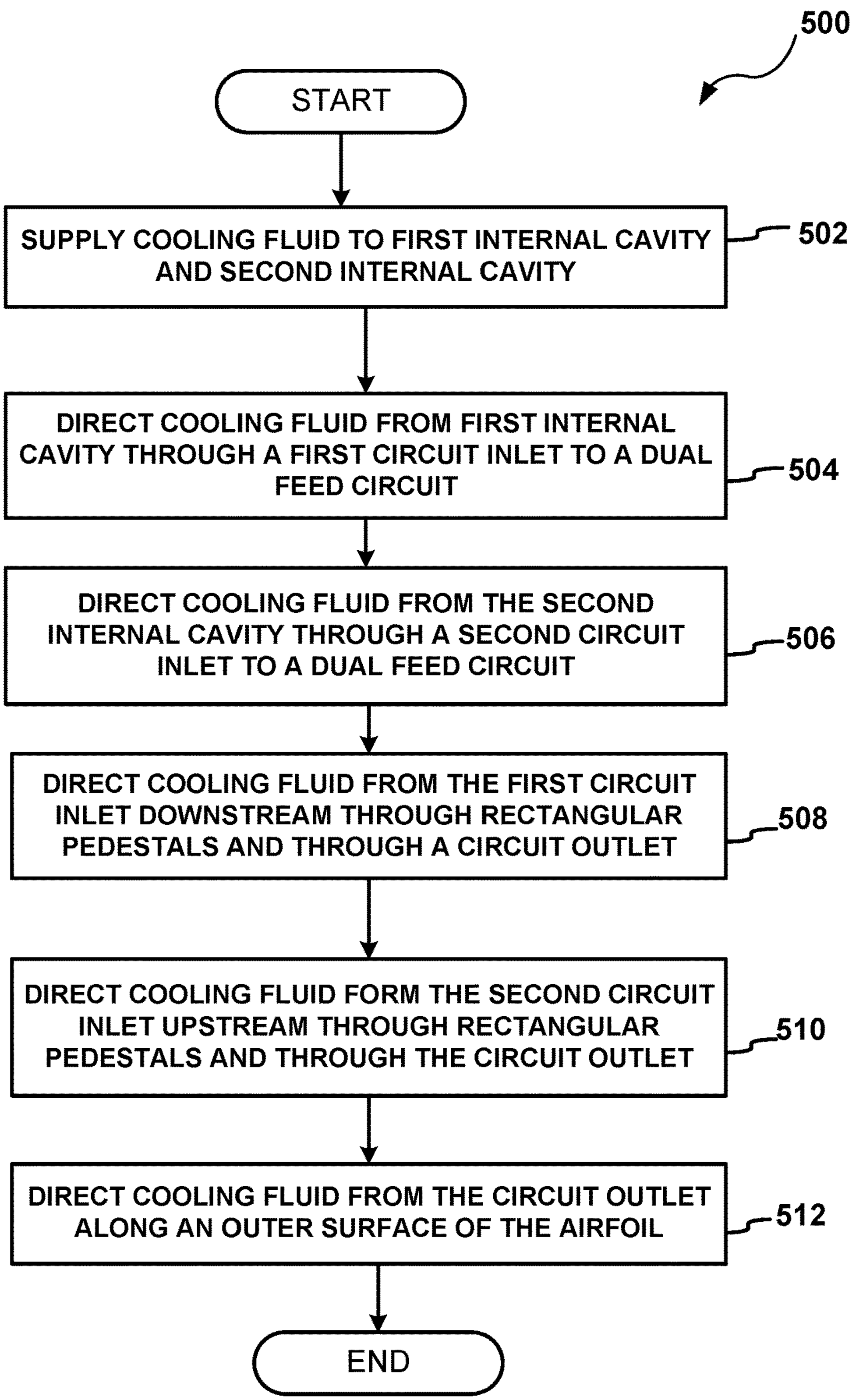
FIG. 5 illustrates an example of a method to cool an airfoil.

FIG. 5 illustrates a flow diagram of a method 500 to cool the airfoil 100. The steps may include additional, different, or fewer operations than illustrated in FIG. 5. The steps may be executed in a different order than illustrated in FIG. 5.

During operation cooling fluid 210 may be supplied to a first internal cavity 106 of the airfoil 100 spar 102 (502). The first internal cavity 106 may be an upstream and/or leading edge internal cavity 106. Additionally or alternatively, may be a central internal cavity 106. During operation cooling fluid 210 may be supplied to a second internal cavity. The second internal cavity 106 may be a downstream and/or trailing edge internal cavity 106. Additionally or alternatively, the second internal cavity 106 may be a central internal cavity 106.

The cooling fluid 210 may be directed from the first internal cavity 106 through a first inlet 120, 202 to a dual feed circuit 118, 200 (504). The first inlet 202 may be an upstream circuit inlet 202. The first inlet 202 may be adjacent to a first dam 208 of the dual feed circuit 118, 200. The first dam 208 may be the upstream dam 208. The cooling fluid 210 may be directed from the second internal cavity 106 though a second inlet 120, 204 to the dual feed circuit 118, 200 (506). The second inlet 204 may be a downstream circuit inlet 204. The second inlet 204 may be adjacent to a second dam 206 of the dual feed circuit. The second dam 206 may be a downstream dam 206.

The cooling fluid 210 may be directed from the first inlet 202 downstream through a plurality of diamond and/or hexangular pedestals 300 and through a circuit outlet 122 (508). The cooling fluid 201 may be directed from the second inlet 204 upstream through the plurality of diamond and/or hexangular pedestals 300 and through the circuit outlet 122 (510). The cooling fluid 210 may be directed from the circuit outlet 122 along an outer surface of the airfoil 100 downstream of the circuit outlet 122.

Each component may include additional, different, or fewer components. Additionally, or alternatively, the airfoil 100 may be implemented with additional, different, or fewer components. For example, the airfoil 100 may include additional or fewer heat exchanging circuits 118. The heat exchanging circuits 118 may include additional dams 206, 208. The spar 102 may include additional or fewer internal cavities 106 and internal ribs 124. The heat exchanging circuits 118 may include fewer or additional pedestals 300. The pedestals 300 may be different or common shapes. The heat exchanging circuits 118 may include fewer or additional circuit inlets 120 and/or circuit outlets 122.

The logic illustrated in the flow diagrams may include additional, different, or fewer operations than illustrated. The operations illustrated may be performed in an order different than illustrated.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a dual-wall airfoil comprising: a spar having a chord axis and a span axis; a coversheet on the spar; and a dual feed circuit between the spar and the coversheet, the dual feed circuit including a first dam, a second dam spaced apart from the first dam along the chord axis of the spar, a first inlet disposed adjacent to the first dam, a second inlet disposed adjacent to the second dam, a circuit outlet disposed between the first inlet and the second inlet, and a plurality of diamond pedestals disposed on an outer surface of the spar, the outer surface of the spar facing the coversheet, the diamond pedestals located between the first inlet and the second inlet forming a plurality of cooling channels between the first inlet and the circuit outlet and between the second inlet and the circuit outlet, and wherein no other circuit inlets are located between the first inlet and the second inlet.

A second aspect relates to the dual-wall airfoil of aspect 1 wherein the first inlet includes a plurality of first inlets disposed in a row and extending parallel to the first dam, and wherein the second inlet includes a plurality of second inlets disposed in a row and extending parallel to the second dam.

A third aspect relates to the dual-wall airfoil of any preceding aspect, wherein the circuit outlet is disposed closer to the second dam than the first dam.

A fourth aspect relates to the dual-wall airfoil of any preceding aspect, wherein the circuit outlet is disposed closer to the first dam than the second dam.

A fifth aspect relates to the dual-wall airfoil of any preceding aspect, wherein the circuit outlet is a slot.

A sixth aspect relates to the dual-wall airfoil of any preceding aspect, wherein the spar further comprises a first internal cavity and a second internal cavity, wherein the first inlet extends through the spar from the first internal cavity to the dual feed circuit and the second inlet extends through the spar from the second internal cavity to the dual feed circuit.

A seventh aspect relates to the dual-wall airfoil of any preceding aspect, wherein the first internal cavity is disposed at a leading edge of the spar and the second internal cavity is disposed at a midpoint of the spar, wherein the dual feed circuit is in fluid communication with the first internal cavity at the leading edge of the spar.

An eight aspect relates to the dual-wall airfoil of any preceding aspect, wherein the second internal cavity is disposed at a trailing edge of the spar and the first internal cavity is disposed at a midpoint of the spar, wherein the dual feed circuit is in fluid communication with the second internal cavity at the trailing edge of the spar.

A ninth aspect relates to the dual-wall airfoil of any preceding aspect, wherein the circuit outlet comprises a plurality of film holes disposed in a row, the row of film holes extending along the span axis of the spar.

A tenth aspect relates to the dual-wall airfoil of any preceding aspect, wherein the circuit outlet comprises parallel rows of film holes.

An eleventh aspect relates to a dual-wall airfoil comprising: a spar, wherein the spar includes a plurality of internal cavities, the internal cavities including a first cavity disposed at a leading edge of the airfoil, a second cavity disposed at a trailing edge of the airfoil, a third cavity disposed between the first cavity and the second cavity; a coversheet on the spar; and a dual feed circuit disposed between the spar and the coversheet, the dual feed circuit including a first dam, a second dam, a first inlet disposed adjacent to the first dam, a second inlet disposed adjacent to the second dam, and a circuit outlet disposed between the first inlet and the second inlet, wherein the first inlet connects the first cavity to the dual feed circuit and the second inlet connects the third cavity to the dual feed circuit or wherein the first inlet connects the third cavity to the dual feed circuit and the second inlet connects the second cavity to the dual feed circuit.

A twelfth aspect relates to the dual-wall airfoil of any preceding aspect, wherein the dual feed circuit is a single dual feed circuit disposed on a pressure side of the airfoil.

A thirteenth aspect relates to the dual-wall airfoil of any preceding aspect, wherein an outer surface of the spar is a continuous, unbroken surface between the first inlet and the second inlet.

A fourteenth aspect relates to a method of cooling an airfoil, the method comprising: supplying a cooling fluid to a first internal cavity of an airfoil spar and a second internal cavity of the airfoil spar; directing the cooling fluid from the first internal cavity through a first inlet to a dual feed circuit, the first inlet adjacent to a first dam of the dual feed circuit; directing the cooling fluid from the second internal cavity though a second inlet to the dual feed circuit, the second inlet adjacent to a second dam of the dual feed circuit; directing the cooling fluid from the first inlet downstream through a plurality of diamond pedestals and through a circuit outlet; directing the cooling fluid from the second inlet upstream through the plurality of diamond pedestals and through the circuit outlet; and directing the cooling fluid from the circuit outlet along an outer surface of the airfoil downstream of the circuit outlet.

A fifteenth aspect relates to method of aspect 14, wherein the first internal cavity is disposed at a leading edge of the airfoil.

A sixteenth aspect relates to the method of any preceding aspect, wherein the second internal cavity is disposed at a trailing edge of the airfoil.

A seventeenth aspect relates to the method of any preceding aspect, wherein the first inlet comprises a single row of holes connecting the first internal cavity to the dual feed circuit.

An eighteenth aspect relates to the method of any preceding aspect, wherein the second inlet comprises a single row of holes connecting the second internal cavity to the dual feed circuit.

In addition to the features mentioned in each of the independent aspects enumerated above, some examples may show, alone or in combination, the optional features mentioned in the dependent aspects and/or as disclosed in the description above and shown in the figures.

What is claimed is:

1. A dual-wall airfoil comprising:

a spar having a chord axis and a span axis;

a coversheet on the spar; and a dual feed circuit between the spar and the coversheet, the dual feed circuit including a first dam, a second dam spaced apart from the first dam along the chord axis of the spar, the first dam and the second dam forming an upstream boundary and a downstream boundary, respectively, of the dual feed circuit, a first inlet disposed adjacent to and downstream of the first dam, a second inlet disposed adjacent to and upstream of the second dam, a circuit outlet disposed between the first inlet and the second inlet, and a plurality of diamond shaped pedestals disposed on an outer surface of the spar, the outer surface of the spar facing the coversheet, the diamond shaped pedestals located between the first inlet and the second inlet forming a plurality of cooling channels between the first inlet and the circuit outlet and between the second inlet and the circuit outlet, and wherein no other circuit inlets are located between the first inlet and the second inlet.

2. The dual-wall airfoil of claim 1 wherein the first inlet includes a plurality of first inlet holes disposed in a row and extending parallel to the first dam, and wherein the second inlet includes a plurality of second inlet holes disposed in a row and extending parallel to the second dam.

3. The dual-wall airfoil of claim 1 wherein the circuit outlet is disposed closer to the second dam than the first dam.

4. The dual-wall airfoil of claim 1 wherein the circuit outlet is disposed closer to the first dam than the second dam.

5. The dual-wall airfoil of claim 1 wherein the circuit outlet is a slot.

6. The dual-wall airfoil of claim 1 wherein the spar further comprises a first internal cavity and a second internal cavity, wherein the first inlet extends through the spar and connects the first internal cavity to the dual feed circuit and the second inlet extends through the spar and connects the second internal cavity to the dual feed circuit.

7. The dual-wall airfoil of claim 6 wherein the first internal cavity is disposed at a leading edge of the spar and the second internal cavity is disposed adjacent to the first internal cavity, wherein the dual feed circuit is in fluid communication with the first internal cavity at the leading edge of the spar.

8. The dual-wall airfoil of claim 6 wherein the second internal cavity is disposed at a trailing edge of the spar and the first internal cavity is disposed adjacent to the second internal cavity, wherein the dual feed circuit is in fluid communication with the second internal cavity at the trailing edge of the spar.

9. The dual-wall airfoil of claim 1 wherein the circuit outlet comprises a plurality of film holes disposed in a row, the row of film holes extending along the span axis of the spar.

10. The dual-wall airfoil of claim 1 wherein the circuit outlet comprises parallel rows of film holes.

11. A dual-wall airfoil comprising:

a spar, wherein the spar includes a plurality of internal cavities, the internal cavities including
 a first cavity disposed at a leading edge of the airfoil,
 a second cavity disposed at a trailing edge of the airfoil,
 a third cavity disposed between the first cavity and the second cavity;
a coversheet on the spar; and
a dual feed circuit disposed between the spar and the coversheet, the dual feed circuit including
 a first dam,
 a second dam,
 a first inlet disposed adjacent to and downstream of the first dam,
 a second inlet disposed adjacent to and upstream of the second dam, and
 a circuit outlet disposed between the first inlet and the second inlet,
wherein the first inlet connects the first cavity to the dual feed circuit and the second inlet connects the third cavity to the dual feed circuit or wherein the first inlet connects the third cavity to the dual feed circuit and the second inlet connects the second cavity to the dual feed circuit.

12. The dual-wall airfoil of claim 11 wherein the dual feed circuit is a single dual feed circuit disposed on a pressure side of the airfoil.

13. The dual-wall airfoil of claim 11 wherein an outer surface of the spar is a continuous, unbroken surface between the first inlet and the second inlet.

14. A method of cooling an airfoil, the method comprising:

supplying a cooling fluid to a first internal cavity of an airfoil spar and a second internal cavity of the airfoil spar;
directing the cooling fluid from the first internal cavity through a first inlet to a dual feed circuit, the first inlet adjacent to and downstream of a first dam of the dual feed circuit;
directing the cooling fluid from the second internal cavity though a second inlet to the dual feed circuit, the second inlet adjacent to and upstream of a second dam of the dual feed circuit;
directing the cooling fluid from the first inlet downstream through a plurality of diamond shaped pedestals and through a circuit outlet;
directing the cooling fluid from the second inlet upstream through the plurality of diamond shaped pedestals and through the circuit outlet; and
directing the cooling fluid from the circuit outlet along an outer surface of the airfoil downstream of the circuit outlet.

15. The method of claim 14 wherein the first internal cavity is disposed at a leading edge of the airfoil.

16. The method of claim 14 wherein the second internal cavity is disposed at a trailing edge of the airfoil.

17. The method of claim 14 wherein the first inlet comprises a single row of holes connecting the first internal cavity to the dual feed circuit.

18. The method of claim 14 wherein the second inlet comprises a single row of holes connecting the second internal cavity to the dual feed circuit.

* * * * *